(12) United States Patent
Hood et al.

(10) Patent No.: US 9,757,704 B2
(45) Date of Patent: Sep. 12, 2017

(54) POLYMERIZABLE LACTAMIC COPOLYMERS SUITABLE FOR THE FORMATION OF COATINGS ON MICROENCAPSULATED PARTICLES

(75) Inventors: David K. Hood, Basking Ridge, NJ (US); Karyn B. Visscher, Morris Plains, NJ (US); Surya Kamin, Skillman, NJ (US)

(73) Assignee: ISP INVESTMENTS LLC, Wilmington, DE (US)

( * ) Notice: Subject to any disclaimer, the term of this patent is extended or adjusted under 35 U.S.C. 154(b) by 0 days.

(21) Appl. No.: 13/518,255

(22) PCT Filed: Dec. 22, 2010

(86) PCT No.: PCT/US2010/061842
§ 371 (c)(1),
(2), (4) Date: Jul. 20, 2012

(87) PCT Pub. No.: WO2011/079209
PCT Pub. Date: Jun. 30, 2011

(65) Prior Publication Data
US 2012/0276211 A1    Nov. 1, 2012

Related U.S. Application Data

(60) Provisional application No. 61/289,166, filed on Dec. 22, 2009.

(51) Int. Cl.
| | | |
|---|---|---|
| *C08F 226/06* | (2006.01) | |
| *B01J 13/14* | (2006.01) | |
| *C09B 67/02* | (2006.01) | |
| *C10M 159/00* | (2006.01) | |
| *C10M 177/00* | (2006.01) | |
| *C11D 3/50* | (2006.01) | |
| *C11D 17/00* | (2006.01) | |

(52) U.S. Cl.
CPC .............. *B01J 13/14* (2013.01); *C08F 226/06* (2013.01); *C09B 67/0097* (2013.01); *C10M 159/005* (2013.01); *C10M 177/00* (2013.01); *C11D 3/505* (2013.01); *C11D 17/0039* (2013.01); *C10M 2209/062* (2013.01); *C10M 2209/084* (2013.01); *C10M 2213/02* (2013.01); *C10M 2217/023* (2013.01); *C10M 2217/024* (2013.01); *C10M 2217/028* (2013.01); *Y10T 428/2998* (2015.01)

(58) Field of Classification Search
None
See application file for complete search history.

(56) References Cited

U.S. PATENT DOCUMENTS

| | | |
|---|---|---|
| 3,939,095 A | 2/1976 | Sliwka et al. |
| 4,590,142 A | 5/1986 | Yamaki et al. |
| 2005/0042758 A1 | 2/2005 | Zyhowski et al. |
| 2007/0077478 A1 | 4/2007 | Nguyen et al. |
| 2009/0041991 A1* | 2/2009 | Takano ............... C09D 11/101 428/195.1 |
| 2009/0043276 A1 | 2/2009 | Weber |
| 2009/0289216 A1 | 11/2009 | Jung et al. |

FOREIGN PATENT DOCUMENTS

WO    WO 2009023843 A1 *  2/2009

OTHER PUBLICATIONS

Kao, F.; Manivannan, G.; Sawan, S. P. UV Curable Bioadhesives: Copolymers of N-Vinyl Pyrrolidone. J. Biomedical Materials Research, 1998, vol. 38, Issue 3, pp. 191-196.*

* cited by examiner

*Primary Examiner* — Jessica Worsham
(74) *Attorney, Agent, or Firm* — Thompson Hine LLP; William J. Davis

(57) ABSTRACT

This present application relates to microcapsules or compositions containing microcapsules wherein the microcapsules comprise a polymerizable lactamic copolymer. More particularly, certain aspects are directed to the use of polymerizable lactamic copolymers in the formation of coatings on microencapsulated particles. These polymerizable lactamic copolymers can result in surface modified microencapsulated particles that may be anionic, non-ionic, or cationic.

7 Claims, 2 Drawing Sheets

POLYMERIZABLE LACTAMIC COPOLYMERS SUITABLE FOR THE FORMATION OF COATINGS ON MICROENCAPSULATED PARTICLES

CROSS REFERENCE TO RELATED APPLICATION

This application claims the benefit of U.S. Provisional Application Ser. No. 61/289,166, filed Dec. 22, 2009, the entire contents of which are hereby incorporated by reference.

FIELD OF THE INVENTION

The present application relates to microcapsules or compositions containing microcapsules wherein the microcapsules comprise a polymerizable lactamic copolymer. More particularly, certain aspects are directed to the use of polymerizable lactamic copolymers in the formation of coatings on microencapsulated particles. These polymerizable lactamic copolymers can result in surface modified microencapsulated particles that are anionic, non-ionic, or cationic.

BACKGROUND OF THE INVENTION

Microencapsulation is the envelopment of an active agent or a core material within a solid wall material. The active or core material can be in the form of a solid particle, a liquid droplet, or a gas bubble. The solid coating used to form the capsule may be, for example, an organic polymer, a wax, or an inorganic oxide.

Many consumer and industrial products employ microencapsulated products to enable effective delivery of active ingredients. For example, fragrances, oils, in-stable inorganic chemicals, agricultural active ingredients, and pharmaceutically active ingredients are commonly commercially deployed with microencapsulation technology. The background for this technology is outlined in "*Microencapsulation,*" Encyclopedia of Polymer Science and Technology, John Wiley and Sons, New York, 2005, the contents of which are hereby incorporated by reference. Examples of microencapsulated particles are presented in FIG. 1.

Several challenges exist for these products. First, encapsulated materials in formulated products should be stable to minimize leakage of the interior components through the shell-wall into the surrounding medium. Second, there should be compatibility and stability between the shell-wall and the surrounding media. Third, the physical strength of the shell-wall should be adjusted to enable the desired breakage behavior for controllable release of interior components. Fourth, the charge of the shell-wall should be adjusted to improve the microencapsulated particle's affinity to a desired surface(s).

In WO 2008/005693A2, A. Farooq et. al. describe the use of lactamic polymers, such as polyvinyl pyrrolidone (PVP), PVP/vinyl acetate (PVP/VA), and poly(vinyl pyrrolidone-co-dimethylaminoethyl methacrylate) (VP/DMAEMA), to treat the surface of microencapsulated particles to improve stability of microencapsulated fragrance particles in fabric softeners. The relevant disclosure in this publication is hereby incorporated by reference.

In U.S. Pat. No. 7,271,204 (B2), R. Fechter et al. describe a method for producing fragrant coating compositions employing UV curable monomers and oligomers. However, the resulting product is not in particulate, or microcapsule, form.

In U.S. Pat. No. 7,119,057 (B2), L. M. Popplewell et al. describe a method for producing fragrant microencapsulated particles that are subsequently coated with a cationic polymer. The initial microencapsulated particles are formed by dispersing poly(acrylamide-co-acrylic acid) and methylated melamine-formaldehyde resin in water followed by the addition of the desired fragrance. Adjustment of pH and elevated temperatures enable cross-linking of the dispersed fragrance droplets. These microencapsulated particles are then treated with a cationic polymer, such as cationic starch or guar.

In U.S. Pat. No. 4,608,330, C. P. Marabella describes a method for producing microcapsules comprised of photosensitive compounds. Among the components of the internal phase are trimethylolpropanetriacrylate and a photoinitiator (Irgacure 651). The internal phase is encapsulated by cross-linking isobutylene-maleic anhydride copolymer (Isobam-10) with a urea-formaldehyde resin.

SUMMARY OF THE INVENTION

The present application describes polymerizable lactamic copolymers suitable for the formation and modification of microencapsulated particles. In accordance with certain embodiments, the lactam in the copolymer is a n-vinyl amide such as vinyl pyrrolidone, vinyl caprolactam, and vinyl formamide. The copolymer can also be comprised of mixtures of n-vinyl amide monomers.

In accordance with one aspect of the present invention, an improved method for forming a coating around microencapsulated particles comprising polymerizable lactamic copolymers is provided. In some cases, the coating may function as a protective coating. In accordance with another aspect, improved and reactive dispersing agents are disclosed. Certain aspects of the present invention provide for a method to adjust the shell-wall surface of a microcapsule to improve the resistance to leakage. In accordance with other aspects, the shell-wall surface can be adjusted to modify the breakage properties of the microcapsule. The shell-wall surface can also be adjusted to enable release components in the microcapsule interior via adjustments to the surrounding environmental temperature. The shell-wall surface charge can also be modified by adjusting charge of the polymerizable lactamic copolymers to be anionic, non-ionic, and/or cationic.

In another embodiment of the invention, the polyvinylamide polymer is comprised of 20-80 wt % of a N-vinyl amide monomer and 80-20 wt % of a dual functional monomer.

In a further embodiment of the invention, the polyvinylamide polymer is comprised of 40-60 wt % of a N-vinyl amide monomer and 60-40 wt % dual functional monomer.

BRIEF DESCRIPTION OF THE DRAWINGS

FIG. 1(*a*) is a microcapsule having a single core encapsulated in a single wall material, FIG. 1(*b*) shows a microcapsule containing several cores within a wall structure and FIG. 1 (*c*) illustrates a single core material encapsulated by multiple layers of wall material.

DETAILED DESCRIPTION

Figure 1:
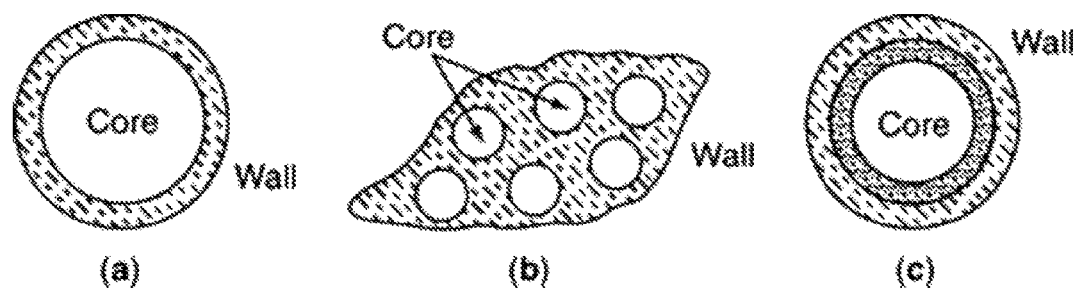
FIG. 1 illustrates some typical examples of microencapsulated particles.

Polymerizable polymers of this invention can be incorporated into or used in conjunction with microencapsulated particles by a variety of known processes. As outlined in "*Microencapsulation*," Encyclopedia of Polymer Science and Technology, John Wiley and Sons, New York, 2005, there are two general process classes for microencapsulation. First is Class A, where the capsule is formed in a liquid filled tank. Second is Class B, where the coating is sprayed or deposited onto the surface of a liquid or solid particle. Within these two classes are numerous processes illustrating the utility of these two approaches. Table 1 below presents examples of known microencapsulation processes in term of respective classes.

TABLE 1

Microencapsulation Processes and Classes

| Type A processes | Type B processes |
|---|---|
| Complex coacervation | Spray drying |
| Polymer-polymer incompatibility | Fluidized bed |
| Interfacial polymerization at liquid-liquid and solid-liquid interfaces | Interfacial polymerization at solid-gas or liquid-gas interfaces |
| In situ polymerization | Centrifugal extrusion |
| Solvent evaporation or in-liquid drying | Extrusion or spraying into a desolvation bath |
| Submerged nozzle extrusion | Rotational suspension separation (spinning disk) |

The terms "microcapsules" and "microencapsulated particles" are used interchangeably herein.

The term "polymerizable functionality" refers to a pendant group or bond capable of being polymerized. The term "reactive functionality" refers to functional groups or bonds capable of reacting with another group or bond. Polymerizable functionalities are a subset of reactive functionalities.

The term "N-vinyl amide monomer" refers to monomers including, but not limited to, N-vinyl pyrrolidone (VP), N-vinyl valerolactam, N-vinyl caprolactam (VCL), and N-vinyl formamide. N-Vinyl pyrrolidone, N-vinyl formamide, and N-vinyl caprolactam are particularly useful.

The term "dual functional monomer" refers to monomers having the structure where Q is an oxirane, oxetane, aziridine, oxazoline, or benzoxazine, E is a polymerizable functionality containing a carbon-carbon double bond and R is an aliphatic and/or aromatic moiety with or without a heteroatom. It is possible to incorporate the monomer into a polymer yielding a free carbon-carbon double bond and/or a free, ionically polymerizable functionality. In certain cases, the dual functional monomer is a monomer other than glycidyl acrylate.

The term "grafting" refers to the incorporation of a specific functionality, specifically a polymerizable functionality, by chemically attaching said functionality to a pre-existing polymeric material. Desirable reactive functionalities suitable for grafting include, but are not limited to, —$CO_2H$, —OH, -amine, nitrile, thiol, —SH, epoxy, oxetane, aziridine, isocyanate, oxazoline, or benzoxazine and combinations thereof. These moieties can be reacted with suitable graft functional monomers, or mixtures of said monomers, such as —$CO_2H$, -anhydride, —OH, -amine, nitrile, thiol, —SH, epoxy, oxetane, aziridine, isocyanate, oxazoline, or benzoxazine and combinations thereof to yield polymerizable polymers.

Polymers described herein can be blended with reactive monomers. Suitable classes of reactive monomers include, but are not limited to, epoxies, oxetanes, aziridines, oxazolines, benzoxazines, acrylates, acetates, maleimides, maleates, fumarates, styreneics, maleic anhydrides, vinyl amides, vinyl ethers, phenolics, cyanate esters, and the like.

Polymers in accordance with certain aspects of the present invention may be non-ionic, anionic, or cationic. Furthermore, polymers or compositions containing the polymers may be in powder, solid, liquid or solution form. The polymers in accordance with certain embodiments are non-hydrogel polymers. Compositions comprising the polymer may be curable via free radical initiators, cationic initiators, anionic initiators, UV radiation, electron beam, or gamma irradiation. These polymers may be utilized as internal shell-wall forming components to the microcapsule. These polymers may be utilized as a layer, or ingredient, to multi-layered microcapsules. These polymers may be utilized in extrusion processes capable of forming small, gel-like particles. Compositions comprising the polymer may be free radically and/or thermally and/or cationically curable or thermally and/or anionically curable. The polymers or compositions containing the polymers may be thermoplastic polymers that can be produced in either liquid or powder form. Other uses in addition to those set forth above are not particularly limited and can readily be determined by one of ordinary skill in the art.

The polyvinyl amide containing a polymerizable functionality of the present invention can be prepared by polymerization techniques known to those ordinarily skilled in the art such as bulk, solution, suspension and emulsion polymerization. Further, those ordinarily skilled in the art understand that the monomers used in preparing the polymer have functional groups which can be preferentially reacted to create a specific polymer for a specific application. Furthermore, it should be understood that reference to a polymer described as being polymerizable or comprising certain monomers typically refers to reaction product formed from the polymerizable moiety or the polymer formed as a reaction product of the specified monomers.

Specific dual functional monomers useful in accordance with the present invention include, without limitation, allyl glycidyl ether ([(2-propenyloxy) methyl]-oxirane), butadiene monoxide, glycidyl methacrylate (GMA), 2-(1-aziridinyl)ethyl methacrylate, vinyl cyclohexene monoxide, 4-vinyl-1-cyclohexene-1,2-epoxide, 2-Isopropenyl-2-oxazoline, 2-isocyanatoethyl methacrylate (ICEMA), 1,3-diallyl-5-glycidylisocyanurate, glycidyl N-(3-isopropenyl dimethylbenzyl)carbamate, 3-N-(6-propyl vinyl ether) benzoxazine, and 2-(3-methyl-3-oxetanemethoxy) ethyl vinyl ether. More than one dual functional monomer may be used.

Specific graft functional monomers useful in accordance with the present invention include, without limitation, dimethylaminoethyl methacrylate, dimethylaminopropylmethacrylamide, maleic anhydride, acrylic acid, vinyl imidazole, 4-vinyl aniline, trimethylvinylsilane, crotonic acid, vinyl sulfone, allyl glycidyl ether ([(2-propenyloxy) methyl]-oxirane), butadiene monoxide, 2-(1-aziridinyl)ethyl methacrylate, vinyl cyclohexene monoxide, 4-vinyl-1-cyclohexene-1,2-epoxide, 2-Isopropenyl-2-oxazoline, 2-isocyanatoethyl methacrylate, acrylic anhydride, glycidyl methacrylate (GMA), 1,3-diallyl-5-glycidylisocyanurate, glycidyl N-(3-isopropenyl dimethylbenzyl)carbamate, 3-N-(6-propyl vinyl ether) benzoxazine, epichlorohydrin, and 2-(3-methyl-3-oxetanemethoxy) ethyl vinyl ether, and vinyl sulfonic acid.

In order to induce polymerization via irradiation, one or more photoinitiators may be incorporated into the system to initiate the polymerization reaction. In accordance with certain embodiments, the photoinitiator typically has high storage stability after being added to the system. Particularly useful photoinitiators include those selected from the following non-limiting groups or classes of compounds such as 2-hydroxy-2-methyl-1-phenylpropane-1-one, 1-hydroxycyclohexyl phenyl ketone, and 2-methyl-1-[4-(methylthio)phenyl]-2-morphorinopropane-1-on; benzoins e.g. benzyl dimethyl ketal; benzophenones such as benzophenone, 4-phenylbenzophenone, and hydroxybenzophenone; thioxanthones such as isopropyithioxanthone and 2,4-diethylthioxanthone; acylphosphine oxides; and other special initiators such as methyl phenyl glyoxylate; bis[4-(di(4-(2-hydroxyethyl)phenyl)sulfonio)phenyl sulfide], a mixture of bis[4-diphenylsulfonio]phenyl)sulfide bis(hexafluoroantimonate and diphenyl-4-thiophenoxyphenylsulfonium hexafluoroantimonate, bis[4-(di(4-(2-hydroxyethyl)phenyl)sulfonio)phenyl sulfide], 5-2,4-cyclopentadiene-1-yl-[(1,2,3,4,5,6-η)-(1-methylethyl-)benzene]-iron (1+)-hexafluorophosphate(1−)), 4-(2-hydroxytetradecanyloxy)diphenyliodonium hexafluoroantimonate, (4-hydroxynaphtyl) dimethylsulfonium hexafluoroantimonate), triphenylsulfonium hexafluorophosphate, triphenylsulfonium hexafluoroantimonate, 4-methoxyphenyldiphenylsulfonium hexafluoroantimonate, 4-methoxyphenyliodonium hexafluoroantimonate, bis(4-tert-butylphenyl)iodonium tetrafluoroborate, (bis(4-tert-butylphenyl)iodonium hexafluorophosphate), (bis(4-tert-phenyl)iodonium hexafluoroantimonate), (bis[4-(diphenylsulfonio)phenyl]sulfide bis (hexafluorophosphate)), aryldiazonium salts, diaryliodonium salts, triaylsulfonium salts, triarylselenonium salts, dialkylphenacylsulfonium salts, triarylsulfoxonium salts, aryloxydiarylsulfonium salts, and the like for example, triphenylsulfonium hexaflurophosphate, methyidiphenylsulfonium hexafluorophosphate, dimethylphenylsulfonium hexaflurophosphate, diphenyinapththylsulfonium hexaflurophosphate, di(methoxynapththyl)methylsulfonium hexaflurophosphate, (4-octyloxyphenyl) phenyl iodonium hexafluoro antimonate, (4-octyloxyphenyl) diphenyl sulfonium hexafluoro antimonate, (4-decyloxyphenyl) phenyl iodonium hexafluoro antimonite, (4-dodecyloxyphenyl)diphenyl sulfonium hexafluoroantimonate. Examples of other particularly useful photoinitiators include 10-biphenyl-4-yl-2-isopropyl-9H-thixanthen-10-ium hexafluorophosphate, 4,4'-dimethyl iodonium hexafluorophosphate, mixed triarylsulfonium hexafluorophosphate salts and reaction products of polyol and 10-(2-carboxymethoxy)-biphenyl-4-yl-2-isopropyl-9-oxo-9H-thioxanthen-10-ium hexafluorophosphate. Further, these photoinitiators may be used alone or in combination thereof. In accordance with particular embodiments, the photoinitiator may be used by mixing it with one or more photopolymerization accelerators, such as a benzoic acid (e.g., 4-dimethylaminobenzoic acid) or a tertiary amine, in any appropriate ratio. In accordance with certain embodiments, the photoinitiator may be added to the photopolymerizable composition in the range of about 0.1% to about 20% by weight.

According to one embodiment of the present invention, the polymerizable polymer is produced through free-radical polymerization in the presence of a free-radical initiator. The contemplated free radical initiators for polymerization include but are not limited to various derivatives of peroxides, peresters and/or azo compounds. More particularly, selected from the group consisting of dicumyl peroxide, dibenzoyl peroxide, 2-butanone peroxide, tert-butyl perbenzoate, di-tert-butyl peroxide, 2,5-bis(tert-butylperoxy)-2,5-dimethylhexane, bis(tert-butyl peroxyisopropyl)benzene, and tert-butyl hydroperoxide, diacyl peroxides, cumene hydroperoxide, dialkyl peroxides, hydroperoxides, ketone peroxides, monoperoxycarbonates, peroxydicarbonates, peroxyesters, and peroxyketals, including tertiary butyl perbenzoate, tertiary butyl peroctoate in diallyl phthalate, diacetyl peroxide in dimethyl phthalate, dibenzoyl peroxide, 1-hydroxy cyclohexyl-1-phenyl ketone, bis (2,4,6-trimethyl benzoyl)phenyl phosphine, benzoin ethyl ether, 2,2-dimethoxy-2-phenyl acetophenone, di(p-chlorobenzoyl) peroxide in dibutyl phthalate, di(2,4-dichlorobenzoyl) peroxide with dibutyl phthalate, dilauroyl peroxide, methyl ethyl ketone peroxide, cyclohexanone peroxide in dibutyl phthalate, 3,5-dihydroxy-3,4-dimethyl-1,2-dioxacyclopentane, t-butylperoxy(2-ethyl hexanoate), caprylyl peroxide, 2,5-dimethyl-2,5-di(benzoyl peroxy) hexane, 1-hydroxy cyclohexyl hydroperoxide-1, t-butyl peroxy (2-ethyl butyrate), 2,5-dimethyl-2,5-bis(t-butyl peroxy) hexane, cumyl hydroperoxide, diacetyl peroxide, t-butyl hydroperoxide, ditertiary butyl peroxide, 3,5-dihydroxy-3,5-dimethyl-1,2-oxacyclopentane, and 1,1-bis(t-butyl peroxy)-3,3,5-trimethyl cyclohexane and di-(4-t-butyl cyclohexyl) peroxydicarbonate, azo compounds such as azobisisobutyronitrile and azobiscyclohexanenitrile (e.g., 2,2'-azobis(2-methylpropanenitrile), 2,2'-azobis(2-methylbutanenitrile), and 1,1'-azobis (cyclohexanecarbonitrile)) and the like as well as mixtures and combinations thereof. Alternatively, any of the foregoing free radical initiators can be used for thermal based polymerization, alone or in an appropriate mixture thereof and wherein, the polymerization reaction is initiated through heat energy. Examples of particular thermal initiators useful herein for thermal polymerization include 2,2'-azobis (2,4-dimethylpentanenitrile), 2,2'-azobis (2-methylpropanenitrile), 2,2'-azobis (2-methylbutanenitrile), peroxides such as benzoyl peroxide, and the like. A particularly useful thermal initiator is 2,2'-azobis(isobutyronitrile).

Suitable amine synergists include 2-dimethylamino-ethyl benzoate, ethyl-4-(dimethylamino)benzoate, and 2-ethylhexyl-4-dimethylaminobenzoate.

Suitable polymeric photoinitiators include di-ester of carboxymethoxy-benzophenone and polytetramethyleneglycol 250, di-ester of carboxymethoxy thioanthone and polytetramethyleneglycol 250, polyethylene glycol(200)di(beta-(4 (acetylphenyl)piperizine))propionate, poly(ethylene glycol) bis(p-dimethylamino benzoate, and piparazino based aminoalkylphenone.

Examples of suitable mono-functional monomers include 2-phenoxy ethyl acrylate (PEA), 2-(2-ethoxyethoxy)ethyl acrylate (EOEOEA), lauryl acrylate (LA), stearyl acrylate (SA), isobornyl acrylate (IBOA), acrylic acid-2-ethylhexyl ester, acryloyl morpholine (ACMO), cyclic trimethylolpropane formal acrylate (CTFA), C8-C10 acrylate (ODA), 2-hydroxy ethyl acrylate (HEA), dimethylaminoethyl methacrylate, dimethylaminopropylmethacrylamide, [3-(methacryloylamino)propyl] trimethylammonium chloride (MAPTAC), (3-acrylamidopropyl)trimethylammonium chloride (APTAC), 2,2,2-trifluoroethyl methacrylate, 2-acrylamido-2-methyl-1-propanesulfonic acid, 2-acrylamido-2-methyl-1-propanesulfonic acid sodium salt, [2-(methacryloyloxy) ethyl]dimethyl-(3-sulfopropyl)ammonium hydroxide, [3-(methacryloylamino)propyl]dimethyl(3-sulfopropyl) ammonium hydroxide inner salt, 4-hydroxy butyl acrylate, isodecyl acrylate (ISODA), lauryl methacrylate (LM), and stearyl methacrylate (SM).

Examples of suitable di-functional monomers include 1,6-hexanediol diacrylate (HDDA), dipropylene glycol diacrylate (DPGDA), tripropylene glycol diacrylate (TPGDA), 1,4-butanediol diacrylate (BDDA), 1,9-nonanediol diacrylate (NNDA), neopentyl glycol diacrylate (NPGDA), propoxylated neopentyl glycol diacrylate (NPG2PODA), polyethylene glycol (200) diacrylate (PEG (200)DA), polyethylene glycol (400) diacrylate (PEG (400)DA), polyethylene glycol (600) diacrylate (PEG (600)DA), ethoxylated bisphenol-A diacrylate (BPA2EODA), triethylene glycol diacrylate (TEGDA), triethylene glycol dimethacrylate (TEGDMA), diethylene glycol dimethacrylate (DEGDMA), and ethoxylated bisphenol-A dimethacrylate (BPA10EODMA).

Examples of suitable tri-functional monomers include trimethylolpropane triacrylate (TMPTA), pentaerythritol triacrylate (PET3A), ethoxylated trimethylolpropane triacrylate (TMP3EOTA), propoxylated tri-methylolpropane triacrylate (TMP3POTA), propoxylated glyceryl triacrylate (GPTA), trimethylolpropane trimethylacrylate (TMPTMA), and ethoxylated trimethylolpropane trimethacrylate (TMP3EOTMA). Examples of multifunctional monomers include pentaerythritol tetraacrylate (PETA) and dipentaerythritol hexaacrylate (DPHA).

Other suitable components for such coatings include monomers such as N-vinyl-2-pyrrolidone, N-vinyl-2-caprolactam, N-vinyl imidazole, 4-acryloyl morpholine, vinyl ethers, vinyl acetates, styrenics, acrylates, (meth)acrylates, polyacrylates, surfactants (anionic, non-ionic, cationic), oxetanes, oxazolines, benzoxazines, ketones, isocyanate based monomers and polymers, acrylated oligomers, oxygen scavengers, moisture scavengers, free radical initiators, cationic initiators, sucrose benzoate(s), optical brighteners, inhibitors, hindered amine light stabilizers, UV absorbers, anti-oxidants, UV urethane oligomers, UV epoxy oligomers, UV unsaturated polyesters, UV glycolic (i.e. polyethylene glycol) acrylates, UV polyester oligomers, silica/silicates, carbon, carbon nano-tubes, silver, alumina/aluminates, zirconates, titanates, salts of alumina, salts of chromium, salts of barium, polyalkylene glycols, acrylated polyalkylene glycols, chlorinated polymers, sulfonated polymers and vinyl silanes.

Suitable solvents can be identified in the Industrial Solvents Handbook, 4ed. edited by E. W. Flick (Noyes Daya Corp, Park Ridge, N.J., 1991). Additional insight to solvent selection is also available in the Polymer Handbook, 4ed. edited by J. Brandrup, E. H. Immergut, and E. A. Grulke (John Wiley, New York, 1999). In the Polymer Handbook, and of particular utility, is *Solubility Parameters Values* by E. A. Grulke. These references are understood to be incorporated in their entirety.

In accordance with one aspect of the present invention, a polymerizable polymer comprising an N-vinyl amide monomer and a dual functional monomer is disclosed. The polymer may comprise:
at least one N-vinyl amide monomer; and
at least one dual functional monomer having the structure

Q-R-E where Q is an oxirane, oxetane, aziridine, oxazoline, or benzoxazine moiety, E is a polymerizable functionality containing a carbon-carbon double bond and R is aliphatic and/or aromatic moiety with or without a heteroatom. It is possible to incorporate the monomer into a polymer yielding a free carbon-carbon double bond and/or a free, ionically polymerizable functionality.

In an embodiment of the invention, the polymerizable polymer may be essentially comprised of about 5 to 95 wt. % and more particularly about 20 to about 80 wt. % of N-vinyl amide monomer, about 0.5 to 60 wt. % and more particularly about 1 to about 30 wt. % of a dual functional monomer having the structure of Q-R-E and about 1 to about 95 wt. % and more particularly about 1 to 80 wt. % of other polymerizable monomers.

In a further embodiment of the invention the polymerizable polymer is essentially comprised of a base polymer made of about 5 to 95 wt. % and more particularly about 10 to about 90 wt. % N-vinyl amide monomer and about 0.5 to 60 wt. % and more particularly about 1 to 30 wt. % a co-monomer suitable for, or capable of, grafting, and about 1 to about 95 wt. % and more particularly about 1 to 80 wt. % of other polymerizable monomers.

The lactamic polymerizable copolymer described herein can be incorporated into a microcapsule composition in accordance with a variety of methods. In accordance with one aspect, a method of producing microcapsules is described wherein a lactamic polymerizable copolymer is admixed with a composition containing microcapsules. In accordance with another aspect, the lactamic polymerizable copolymer can be included in one or more of the compositions used to produce the microcapsules. In accordance with a particular encapsulation method, an internal phase is emulsified in an external phase to produce droplets of the internal phase and the droplets are then encapsulated to produce the microcapsules. At least one of the internal phase and the external phase can contain a lactamic polymerizable copolymer.

Microencapsulated products of this invention can be used for a wide variety of applications including, but not limited to, personal care (hair and skin), household institutional and laundry (cleaners, soaps, and detergents), agriculture, paints and coatings, biocide, medical devices, pharmaceutical drug delivery, oil field delivery applications, paper, food technologies, adhesives, inkjet inks and coatings, inks, and lubricants.

Certain aspects of the present invention are illustrated by the following non-limiting examples:

Example 1—Microencapsulation Via Thermal Curing Process

The following components were mixed and incorporated in an 8 dram vial:
1 g Poly(VP/VA/GMA) (11325-137B) in 3,4-epoxycyclohexylmethyl-3,4-epoxycyclohexanecarbonate (10% VP/VA/GMA in 3,4-epoxycyclohexylmethyl-3,4-epoxycyclohexanecarbonate)
1 g Xtend-226 (Phenylethyl benzoate)
0.1 g Indigo pigment (water insoluble)
3 drops of DETA (diethylene triamine) were added and stirred to incorporate. One 'drop' of ViviPrint 300 (DMAPMA/HEMA co-polymer) (30% solids in water) was added and incorporated by stirring.

Figure 2:
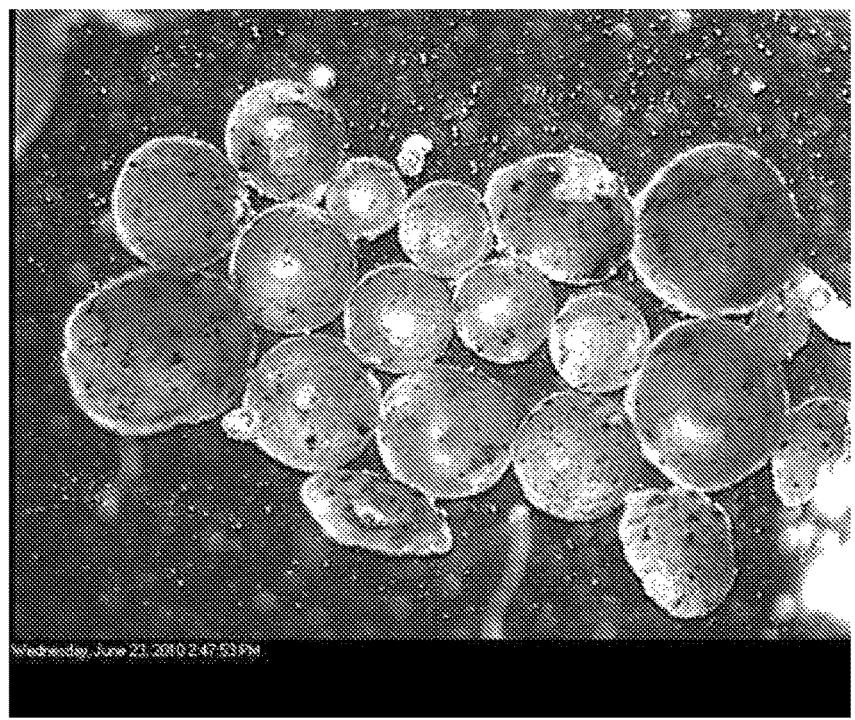
FIG. 2 is a photomicrograph of the small colored beads or capsules produced in accordance with Example 1.

The above mixture was added to a mixture of 100 mL water and 5 g Jeffamine D400 (Polyoxypropylenediamine). Drops were added, if possible, if not, the mixture was added in a stream which would break into drops or beads while stirring. The initial water was removed (without disturbing the beads), additional water was added to wash the beads and neutralize the solution. The process resulted in small blue colored beads or capsules as shown in FIG. 2. The capsules were examined under a microscope and the diameter of the beads may be roughly estimated to be 0.5-1 mm.

Example 2—Microencapsulation Via UV Curing Process

For UV Cure formation of microcapsules, an oil phase was prepared from the following components:
0.2 g poly(VCap-PEA-HEA acrylate) (6.2%)
2.0 g GPTA (propoxylated glyceryl triacrylate (Sartomer)) (62%)

1.0 g Linseed Oil (31%)

0.02 g Darocur 1173 (2-Hydroxy-2-methyl-1-phenyl-1-propanone photo-initiator (BASF)) (0.62%)

The water phase comprises:

1.2 g poly(VCap/VP/DMAEMA) quaternized with the addition of glycidyl methacrylate in IPA/Water (25% solids)

28.8 g DI Water (99%)

Figure 3:
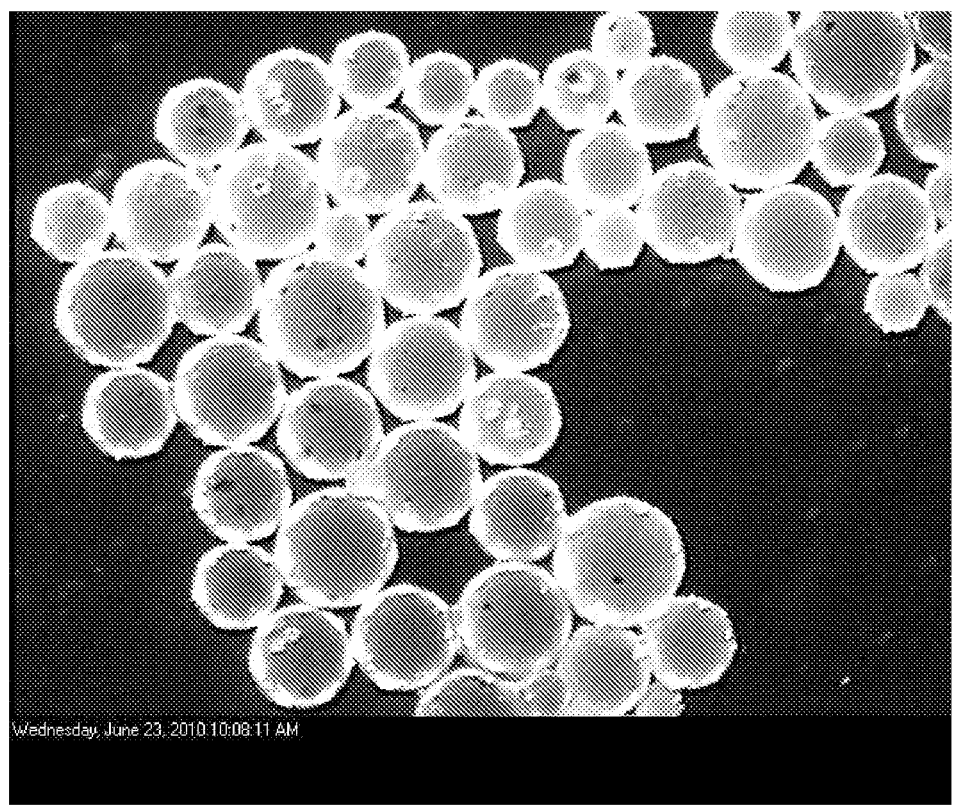
FIG. 3 is a photomicrograph of the microcapsules produced in accordance with Example 2

The oil phase was added dropwise to the water phase while exposed to UV light. A photomicrograph of the product is provided as FIG. 3. Particles were examined using a light microscope.

Example 3—Synthesis of Microencapsulated Particle with VP/VA/GMA

Employing the teachings of U.S. Pat. No. 3,997,306 (the contents of which are hereby incorporated by reference), as a guide for the production of a microencapsulated particle, the following process was designed:

The electrophoretic medium internal phase (hydrocarbon containing titania and carbon black particles) would be emulsified in water in the presence of VP/VA/GMA for one hour with mechanical agitation to form a hydrocarbon-in-water emulsion. To this emulsion, there would be added dropwise an aqueous solution of polyethyleneimine (PEI), with continued mechanical agitation. The reaction would be allowed to proceed for 15 minutes after the addition of the PEI had been completed and the resultant capsules would be separated from the liquid by centrifugation. The chemical structure for PVP/VA/GMA is presented in Structure 2 where x, y and z represent mole fraction expressed as a percent and x+y+z=100.

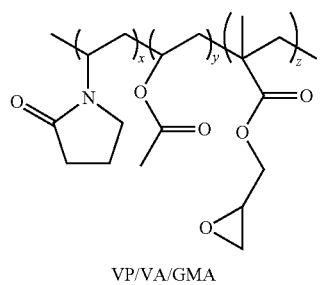

Structure 2

VP/VA/GMA

Example 4—Synthesis of Microencapsulated Particle with VCL/VA/GMA

Employing the teachings of U.S. Pat. No. 7,119,057 (B2), (the contents of which are hereby incorporated by reference), as a guide for the production of a microencapsulated particle, the following process was designed:

The initial microencapsulated particles are formed by dispersing poly(acrylamide-co-acrylic acid) and PVCL/VA/GMA resin in water followed by the addition of the desired fragrance. Elevated temperatures enable cross-linking of the dispersed fragrance droplets. The chemical structure for PVCL/VA/GMA is presented in Structure 3 where x, y and z represent mole fraction expressed as a percent and x+y+z=100.

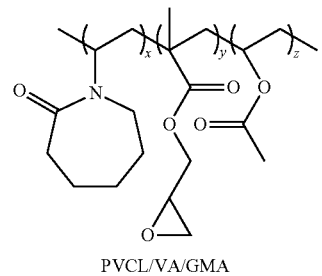

Structure 3

PVCL/VA/GMA

Example 5—Synthesis of Microencapsulated Particle with VCL/VA/GMA

Employing the teachings of U.S. Pat. No. 7,119,057 (B2), (the contents of which are hereby incorporated by reference), as a guide for the production of a microencapsulated particle, the following process was designed:

The initial microencapsulated particles are formed by dispersing poly(maleic acid-co-methyl vinyl ether) and PVCL/VA/GMA resin in water followed by the addition of the desired oil. Elevating the temperature enables cross-linking of the dispersed oil droplets.

Example 6—Synthesis of Microencapsulated Particle with VCL/PEA/ICEMA

Employing the teachings of WO 2009/063257(A2), (the contents of which are hereby incorporated by reference), as a guide for the production of a microencapsulated particle, the following process was designed:

A solution of 5% w/w VCL/PEA/ICEMA was prepared in Solvesso 200ND. Meanwhile, extra water was added to a surface amino-silane modified Kaolin dispersion and then to this dispersion, the Solvesso 200ND plus VCL/PEA (phenoxy ethyl acrylate)/ICEMA was added dropwise with mixing by a Ystral high shear mixer operated at about 5000 rpm. The concentrations are provided in Table 2 below:

TABLE 2

| VCap/PEA/ICEMA Microcapsule Particle | |
|---|---|
| Ingredient | Concentration (% w/w) |
| Solvesso 200ND | 38 |
| VCap/PEA/ICEMA | 2 |
| 5% w/w amino-silane modified clay slurry in water | 50 |
| Water | 10 |
| Total | 100 |

Subsequently, an oil in water [O/W] emulsion can be prepared by high shear mixing with the Ystral high shear mixer at about 20000 rpm for 2 minutes, which would then develop into a microcapsule system as a cross-linking reaction took place. The structure of VCap/PEA/ICEMA is presented below in Structure 4 where x, y and z represent mole fraction expressed as a percent and x+y+z=100.

Structure 4

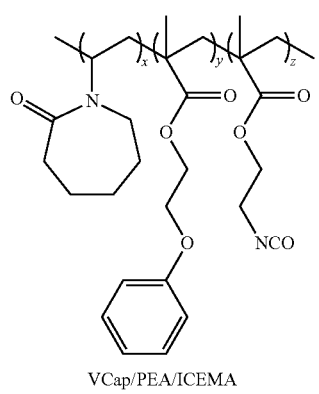

VCap/PEA/ICEMA

Example 7—Microcapsules Formed from VCap/VP/DMAEMA/GMA

Employing the teachings of U.S. Pat. No. 4,588,639, (the contents of which are hereby incorporated by reference), as a guide for the production of a microencapsulated particle, the following process was designed:

11.2 grams of a composition of 10 parts of tetraethylene glycol dimethacrylate, 0.5 parts of 2,2-diethoxyacetophenone, and 0.7 parts of Oil Yellow #5001 would be dispersed and emulsified in 500 mL of water containing 5 grams of VCap/VP/DMAEMA/GMA. The dispersion can be cured with UV light to yield spherical microencapsulated particles. Thermally activated free-radical initiators can also be employed in this process by elevated temperature after emulsification. The structure of VCap/VP/DMAEMA/GMA is presented below in Structure 5 where w, x, y and z represent mole fraction expressed as a percent and w+x+y+z=100.

Structure 5

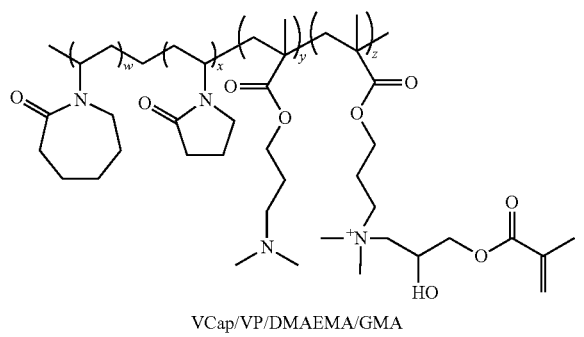

VCap/VP/DMAEMA/GMA

Example 8—Microcapsules Formed from VCap/VP/DMAEMA/GMA

The PVP/acrylic acid (AA)/lauryl methacrylate (LM)/GMA polymer presented in Structure 6 could be employed in the process described in Example 7 where x, y, z and a represent mole fraction expressed as a percent and x+y+z+a=100.

Structure 6

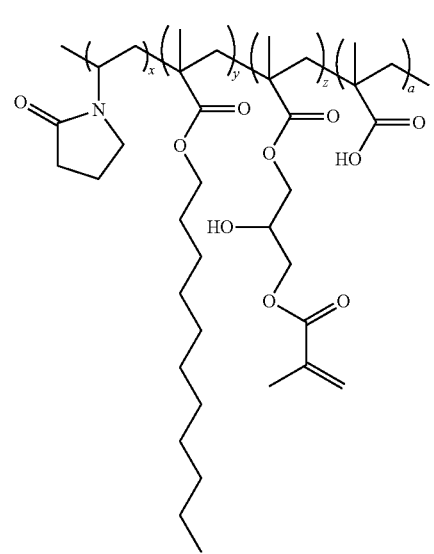

PVP/AA/LM/GMA

Example 9

Microcapsules Formed from VCap/dimethylaminopropyl methacrylate(DMAPMA)/hydroxyethyl methacrylate (HEMA)/GMA/hydrochloride (HCL)

The VCap/DMAPMA/HEMA/GMA/HCL polymer presented in Structure 7 could be employed in the process described in Example 7 where x, y, z and a represent mole fraction expressed as a percent and x+y+z+a=100.

Structure 7

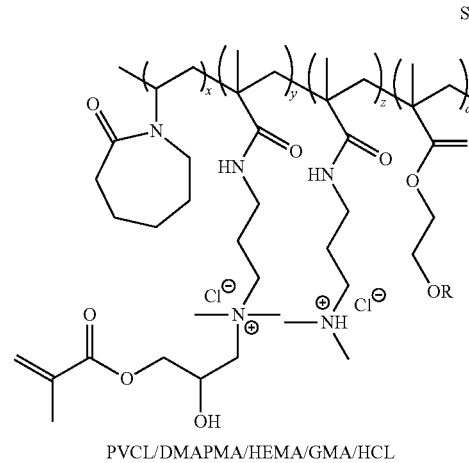

PVCL/DMAPMA/HEMA/GMA/HCL

R = H or possibly 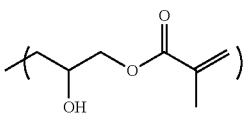

Example 10

Microcapsules Formed from VCap/PEA/2-hydroxy ethyl acrylate (HEA)/acrylic anhydride The VCap/PEA/HEA/acrylic anhydride in Structure 8 could be employed in the process described in Example 7 where x, y, z and a represent mole fraction expressed as a percent and x+y+z+a=100.

Structure 8

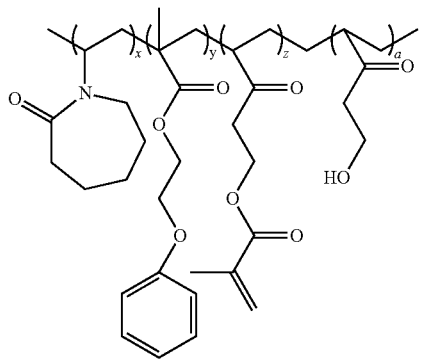

PVCL/PEA/HEA/Acrylic Anhydride

What is claimed:

1. A microencapsulated particle comprising a coating, the coating comprising a lactamic polymerizable copolymer wherein the lactamic polymerizable copolymer consists of N-vinyl caprolactam, 2-phenoxy ethyl acrylate, 2-hydroxy ethyl acrylate VCap-PEA-HEA) and, optionally, acrylic anhydride.

2. A microencapsulated particle in accordance with claim 1 wherein the lactamic polymerizable copolymer is polymerized to the surface of the particle.

3. A microencapsulated particle in accordance with claim 2 wherein the lactamic polymerizable copolymer is polymerized through at least one process selected from the group consisting of thermal polymerization, cationic polymerization, anionic polymerization, free-radical polymerization and combinations thereof.

4. A microencapsulated particle in accordance with claim 1 wherein the lactamic polymerizable copolymer renders a cationic, non-ionic or anionic surface charge to the particle.

5. A microencapsulated particle in accordance with claim 1 wherein the microencapsulated particle comprises a core material at least partially encapsulated by a wall material.

6. A microencapsulated particle in accordance with claim 5 wherein the core material comprises at least one material selected from the group consisting of a fragrance, an oil, an agricultural active, a biocide, a pharmaceutically active material, a sunscreen, a UV absorber, a UV curable adhesive, a lubricant, an abrasive, a wax, a water soluble molecule, a pigment, a colorant, a peroxide, a water sensitive inorganic chemical, an oil field chemical, and a vitamin.

7. A microencapsulated particle in accordance with claim 1 wherein the lactamic polymerizable copolymer consisting of about 5 to 95 wt. % of VCap.

* * * * *